United States Patent
Suzuki et al.

(10) Patent No.: US 11,555,922 B2
(45) Date of Patent: Jan. 17, 2023

(54) OBJECT DETECTION DEVICE

(71) Applicant: DENSO CORPORATION, Kariya (JP)

(72) Inventors: Yohei Suzuki, Nisshin (JP); Taketo Harada, Nisshin (JP); Mitsuyasu Matsuura, Nisshin (JP); Tetsuya Aoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 339 days.

(21) Appl. No.: 16/829,473

(22) Filed: Mar. 25, 2020

(65) Prior Publication Data

US 2020/0225346 A1 Jul. 16, 2020

Related U.S. Application Data

(63) Continuation of application No. PCT/JP2018/034056, filed on Sep. 13, 2018.

(30) Foreign Application Priority Data

Sep. 28, 2017 (JP) .............................. JP2017-188411

(51) Int. Cl.
  *G01S 15/12* (2006.01)
  *G01S 7/52* (2006.01)
  *G01S 7/524* (2006.01)
  *G01S 7/526* (2006.01)

(52) U.S. Cl.
  CPC .............. *G01S 15/12* (2013.01); *G01S 7/524* (2013.01); *G01S 7/526* (2013.01); *G01S 7/52006* (2013.01)

(58) Field of Classification Search
  CPC ...... G01S 15/12; G01S 7/52006; G01S 7/524; G01S 7/526; G01S 7/52004; G01S 15/931; G01S 15/104
  See application file for complete search history.

(56) References Cited

U.S. PATENT DOCUMENTS

2020/0049816 A1    2/2020  Suzuki et al.
2020/0225346 A1*   7/2020  Suzuki .................... G01S 15/12

FOREIGN PATENT DOCUMENTS

| CN | 111183368 A  * | 5/2020 | ........... G01S 15/104 |
| DE | 101 06 142 A1 | 8/2002 | |
| DE | 10106142 A1 | 8/2002 | |
| DE | 10 2016 101 358 A1 | 7/2017 | |
| DE | 112018004296 T5 * | 5/2020 | ........... G01S 15/104 |

(Continued)

*Primary Examiner* — Daniel Pihulic
(74) *Attorney, Agent, or Firm* — Maschoff Brennan

(57) ABSTRACT

An object detection device comprises a transmission sound pressure adjustment unit adjusting a sound pressure of the search wave so that the sound pressure of the search wave or a reflected wave based on the search wave is within a predetermined transmission target range. The transmission unit transmits, as the search wave, a first search wave with a first frequency changing with time at a first rate and a second search wave with a second frequency changing with time at a second rate that is different from the first rate. The transmission sound pressure adjustment unit is configured to adjust the sound pressure of each of the first and second search waves so that the sound pressure of the corresponding one of the first and second search waves or the reflected wave based on the corresponding one of the first and second search waves is within the transmission target range.

16 Claims, 10 Drawing Sheets

(56) References Cited

FOREIGN PATENT DOCUMENTS

| JP | 61-220593 | A | | 9/1986 | | |
|----|----|----|----|----|----|----|
| JP | 62-027685 | A | | 2/1987 | | |
| JP | 2519256 | B2 | | 7/1996 | | |
| JP | 2011-232055 | A | | 11/2011 | | |
| JP | 2018-179676 | A | | 11/2018 | | |
| JP | 2019066192 | A | * | 4/2019 | ........... | G01S 15/104 |
| JP | 6888506 | B2 | * | 6/2021 | ........... | G01S 15/104 |
| WO | WO-2019065282 | A1 | * | 4/2019 | ........... | G01S 15/104 |

* cited by examiner

OBJECT DETECTION DEVICE

CROSS-REFERENCE TO RELATED APPLICATION

The present application is a continuation application of International Application No. PCT/JP2018/034056, filed on Sep. 13, 2018, which claims priority to Japanese Patent Application No. 2017-188411 filed on Sep. 28, 2017. The contents of these applications are incorporated herein by reference in their entirety.

BACKGROUND

Technical Field

The present disclosure relates to an object detection device.

Background Art

Conventionally, there has been proposed an object detection device that transmits ultrasonic waves and receives the reflected waves of the transmitted ultrasonic waves to detect the object that reflected the ultrasonic waves.

SUMMARY

In the present disclosure, provided is an object detection device as the following. The object detection device comprises a transmission sound pressure adjustment unit that adjusts a sound pressure of a search wave so that the sound pressure of the search wave or a sound pressure of a reflected wave based on the search wave is within a predetermined transmission target range, a transmission unit transmits, as the search wave, a first search wave with a first frequency that changes with time at a first rate and a second search wave with a second frequency that changes with time at a second rate that is different from the first rate of the first search wave, and the transmission sound pressure adjustment unit is configured to adjust the sound pressure of each of the first and second search waves so that the sound pressure of the corresponding one of the first and second search waves or the sound pressure of the reflected wave based on the corresponding one of the first and second search waves is within the transmission target range.

DETAILED DESCRIPTION OF THE PREFERRED EMBODIMENTS

Figure 1:
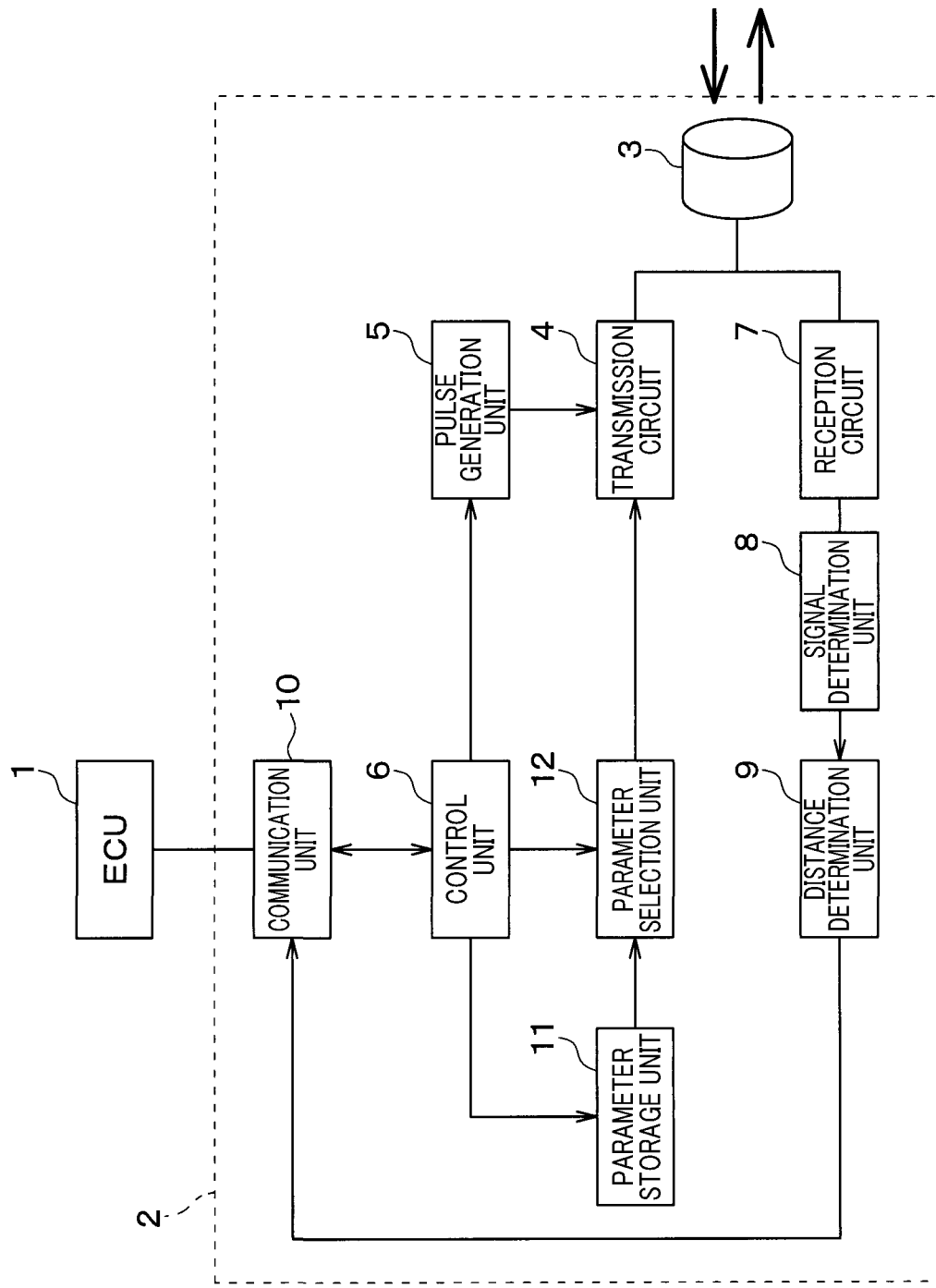
FIG. 1 is a configuration diagram of an object detection device according to the first embodiment.

Conventionally, there has been proposed an object detection device that transmits ultrasonic waves and receives the reflected waves of the transmitted ultrasonic waves to detect the object that reflected the ultrasonic waves. When such an object detection device is mounted on a vehicle or the like for obstacle detection, the accuracy of object detection may be reduced due to interference with ultrasonic signals emitted by other vehicles around it.

In this regard, for example, PTL 1 proposes an object detection device configured to sweep the frequency of the transmission wave and discriminate between reflected waves of the ultrasonic waves transmitted by itself and ultrasonic waves generated by other devices based on whether the received wave contains a chirp signal whose frequency changes in the same manner as the transmission wave.

[PTL 1] DE 10106142 A

An object detection device utilizing a chirp signal may use, for example, a plurality of chirp signals whose frequencies change at different rates in order to improve the accuracy of distinguishing ultrasonic waves.

An example of the ultrasonic transceiver used in such device is a resonant microphone. However, the resonance band of a resonant microphone is narrow and further it varies from device to device. As a result, the sound pressure of the transmission wave may differ for each chirp signal, and the detection performance such as the detection start distance may differ.

In view of the above-described problem, the present disclosure aims at providing an object detection device capable of reducing the variation in detection performance for each chirp signal.

In order to achieve the above objective, according to one aspect of the present disclosure, an object detection device comprises: a transmission unit that transmits an ultrasonic wave as a search wave; a reception unit that receives an ultrasonic wave and outputs a signal as an output signal; and a distance detection unit that detects a distance to an object based on the output signal of the reception unit, when a frequency of the ultrasonic wave received by the reception unit changes in the same manner as a frequency of the search wave, wherein the object detection device further comprises a transmission sound pressure adjustment unit that adjusts a sound pressure of the search wave so that the sound pressure of the search wave or a sound pressure of a reflected wave based on the search wave is within a predetermined transmission target range, the transmission unit transmits, as the search wave, a first search wave with a first frequency that changes with time at a first rate and a second search wave with a second frequency that changes with time at a second rate that is different from the first rate of the first search wave, and the transmission sound pressure adjustment unit is configured to adjust the sound pressure of each of the first and second search waves so that the sound pressure of the corresponding one of the first and second search waves or the sound pressure of the reflected wave based on the corresponding one of the first and second search waves is within the transmission target range.

By adjusting the sound pressure of each of the first and second search waves so that the sound pressure of the corresponding one of the first and second search waves is within the transmission target range in such manner, the difference in sound pressure between the reflected wave of the first search wave and the reflected wave of the second search wave can be reduced. Therefore, the difference in detection performance between when the first search wave is transmitted and when the second search wave is transmitted can be reduced.

The reference signs in parentheses attached to the components or the like indicate examples of the correspondence between the components or the like and the specific components described in relation to the embodiments described below.

Embodiments of the present disclosure will be described below with reference to the drawings. In the following embodiments, parts of an embodiment that are the same or equivalent to parts of another embodiment are assigned with the same reference signs.

First Embodiment

The first embodiment will be described. The object detection device according to the present embodiment is a so-called ultrasonic sonar device configured to detect, for example, the presence of or the distance to an object around the vehicle. As shown in FIG. 1, the object detection device includes an ECU 1 and an ultrasonic sensor 2.

The ultrasonic sensor 2 includes a microphone 3, a transmission circuit 4, a pulse generation unit 5, a control unit 6, a reception circuit 7, a signal determination unit 8, a distance determination unit 9, a communication unit 10, a parameter storage unit 11, and a parameter selection unit 12. The parameter storage unit 11 is a non-transitory tangible storage medium.

The microphone 3 is placed so as to face the outer surface of the vehicle, and it transmits ultrasonic waves as search waves to detect an object toward the outside of the vehicle. Specifically, the microphone 3 includes a piezoelectric element (not shown) having a configuration in which a piezoelectric film is disposed between two electrodes facing each other. The two electrodes are connected to the transmission circuit 4, and an AC voltage is applied from the transmission circuit 4 so that the piezoelectric film is deformed and an ultrasonic wave is transmitted from the microphone 3 to the outside of the vehicle.

The transmission circuit 4 is configured to perform D/A conversion on the input signal and output a voltage generated thereby. The transmission circuit 4 is connected with the pulse generation unit 5 that generates pulse signals. The transmission circuit 4 performs D/A conversion on the pulse signal input from the pulse generation unit 5 and applies the generated AC voltage to the microphone 3.

As described above, the microphone 3 and the transmission circuit 4 are configured to convert the pulse signal generated by the pulse generation unit 5 into an ultrasonic wave and transmit the converted ultrasonic wave, and the microphone 3 and the transmission circuit 4 correspond to a transmission unit.

The amplitude of the AC voltage output from the transmission circuit 4 changes according to a signal input from the outside, and the larger the input signal, the larger the amplitude of the AC voltage. In the present embodiment, the amplitude of the AC voltage varies depending on the current value input from the parameter selection unit 12 to the transmission circuit 4.

Note that the microphone 3, the transmission circuit 4, the pulse generation unit 5, and the control unit 6 are configured so that a search wave including a chirp signal whose frequency changes with time is transmitted from the microphone 3. Further, they are configured so that search waves of a plurality of patterns including different types of chirp signals are transmitted from the microphone 3, and the patterns of the search waves are determined by a transmission instruction issued from the control unit 6 to the pulse generation unit 5. In the present embodiment, the microphone 3 transmits a first search wave with a first frequency that changes with time at a first rate and a second search wave with a second frequency that changes with time at a second rate that is different from that the first rate of the first search wave.

Specifically, when a first pattern transmission instruction is issued from the control unit 6 to the pulse generation unit 5, the pulse generation unit 5 generates a pulse signal whose frequency increases with time. As a result, a first search wave including an up-chirp signal whose frequency increases with time is transmitted from the microphone 3.

When a second pattern transmission instruction is issued from the control unit 6 to the pulse generation unit 5, the pulse generation unit 5 generates a pulse signal whose frequency decreases with time. As a result, a second search wave including a down-chirp signal whose frequency decreases with time is transmitted from the microphone 3.

The microphone 3 is configured to transmit ultrasonic waves, receive ultrasonic waves, and output a voltage corresponding to the sound pressure of the received ultrasonic wave. Specifically, the two electrodes of the piezoelectric element of the microphone 3 are also connected to the receiving circuit 7, and the voltage between the two electrodes generated when the ultrasonic wave is received and the piezoelectric film is deformed is input to the receiving circuit 7.

The receiving circuit 7 performs A/D conversion on the voltage input from the microphone 3. The reception circuit 7 detects the frequency and amplitude of the received wave by quadrature demodulation using the signal generated by the A/D conversion, and transmits the frequency information and amplitude information to the signal determination unit 8.

As described above, the microphone 3 and the receiving circuit 7 are configured to receive an ultrasonic wave and output a signal corresponding to the received ultrasonic wave, and they correspond to a receiving unit.

The signal determination unit 8 determines whether or not the ultrasonic wave received by the microphone 3 is a reflected wave of the search wave transmitted by the microphone 3. Specifically, the signal determination unit 8 detects a chirp signal included in the ultrasonic wave received by the microphone 3 based on the frequency information transmitted from the receiving circuit 7. When the microphone 3 transmits the first search wave, the signal determination unit 8 determines that the received wave is a reflected wave of the search wave transmitted from the microphone 3 if the detected chirp signal is an up-chirp signal. When the microphone 3 transmits the second search wave, the signal determination unit 8 determines that the received wave is a reflected wave of the search wave transmitted from the microphone 3 if the detected chirp signal is a down-chirp signal.

Thus, the signal determination unit 8 determines that the ultrasonic wave received by the microphone 3 is the reflected wave of the search wave transmitted by the microphone 3 when the frequency of the received wave changes in the same manner as the frequency of the search wave. The signal determination unit 8 sends the determination result as well as the amplitude information transmitted from the reception circuit 7 to the distance determination unit 9.

The distance determination unit 9 calculates the distance to the object outside the vehicle based on the time from the transmission of the search wave to the reception of the reflected wave of the search wave by the microphone 3, and then determines whether the calculated distance is equal to or smaller than a predetermined threshold. Specifically, the distance determination unit 9 calculates the distance to the object based on the time from when the search wave is transmitted from the microphone 3 to when the amplitude of the received wave detected by the receiving circuit 7 becomes equal to or greater than a predetermined value. The distance determination unit 9 corresponds to the distance detection unit.

Note that the distance determination unit 9 calculates the distance to the object and determines whether the calculated distance is equal to or smaller than a predetermined threshold only when the signal determination unit 8 determines that the ultrasonic wave received by the microphone 3 is a reflected wave of the search wave transmitted by the microphone 3. The distance determination unit 9 sends the determination result to the communication unit 10.

The communication unit 10 communicates with the ECU 1. The determination result of the distance determination unit 9 is transmitted to the ECU 1 via the communication unit 10. When the distance determination unit 9 has determined that the distance to the object is equal to or smaller than the predetermined threshold, the notification unit configured by a monitor, a buzzer, or the like (not shown) connected to the ECU 1 notifies the driver that there is an object at a distance smaller than a predetermined distance.

The control unit 6, the distance determination unit 9, and the like are configured by a known microcomputer including a CPU, ROM, RAM, I/O, and the like, and execute processing such as various calculations according to programs stored in the ROM or the like. ROM and RAM are non-transitory tangible storage medium.

The operation of the object detection device will be described. The control unit 6 of the object detection device sends a wave transmission instruction to the pulse generation unit 5 according to an instruction sent from the ECU 1 via the communication unit 10, and the pulse generation unit 5 starts generating a pulse signal. When the pulse signal generated by the pulse generation unit 5 is D/A converted by the transmission circuit 4, and an AC voltage is applied from the transmission circuit 4 to the microphone 3, an ultrasonic wave as a search wave is transmitted from the microphone 3. At this time, the pulse generation unit 5 changes the frequency of the generated pulse signal as a function of time in accordance with the transmission instruction from the control unit 6. The first search wave or the second search wave is thus transmitted from the microphone 3.

When the search wave is reflected by an object outside the vehicle and the microphone 3 receives the reflected wave of the search wave, the voltage between the two electrodes of the piezoelectric element in the microphone 3 changes. This voltage is input to the receiving circuit 7. The receiving circuit 7 performs A/D conversion on the input voltage, and then orthogonal demodulation is performed using the signal generated by the A/D conversion to detect the frequency and amplitude of the received wave.

The signal determination unit 8 detects the change in the frequency of the received wave from the frequency detected by the reception circuit 7, and determines whether or not the frequency of the received wave changes in the same manner as the pulse signal generated by the pulse generation unit 5. That is, when the microphone 3 transmits the first search wave, it is determined whether or not the received wave includes an up-chirp signal whose frequency increases with time. When the microphone 3 transmits the second search wave, it is determined whether or not the received wave includes a down-chirp signal whose frequency decreases with time.

The ultrasonic wave received by the microphone 3 may include, for example, an ultrasonic wave transmitted by another vehicle other than the reflected wave of the search wave transmitted by the microphone 3. However, since the frequency of the search wave is characterized in the above-described way, and the change in the frequency of the received wave and the change in the frequency of the search wave are compared to determine whether or not the received wave is a reflected wave of the search wave transmitted from the microphone 3, interference can be avoided and the accuracy of object detection can be improved.

When it is determined by the signal determination unit 8 that the frequency of the received wave is changing in the same manner as the pulse signal generated by the pulse generation unit 5, the distance determination unit 9 calculates the distance to the object outside the vehicle that reflected the search wave. The distance determination unit 9 calculates the distance to the object based on the time elapsed from the transmission of the search wave from the microphone 3 until the amplitude of the received wave becomes equal to or greater than a predetermined value, then determines whether the calculated distance is equal to or smaller than a predetermined threshold, and sends the determination result to the communication unit 10.

When the distance determination unit 9 determines that the distance to the object is equal to or smaller than the predetermined threshold, the ECU 1 issues an instruction to the notification unit (not shown) to notify the driver.

Figure 2:
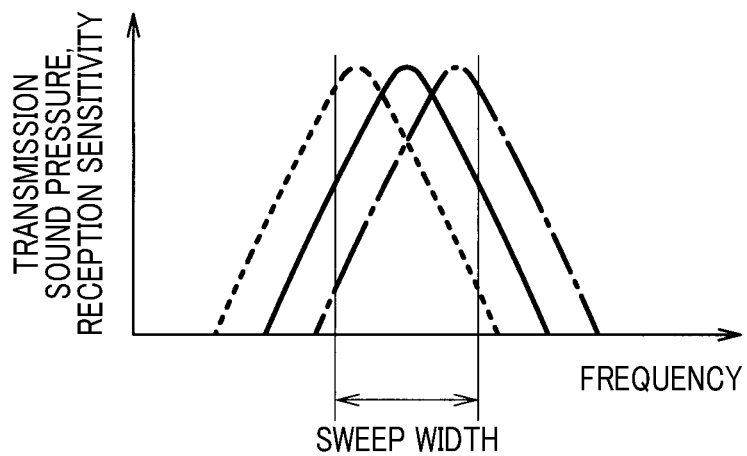
FIG. 2 is a graph showing the characteristics of a microphone.

As shown in FIG. 2, the sound pressure of the transmission wave of the microphone 3 and the reception sensitivity change depending on the frequencies of the transmission wave and the received wave, respectively. They have a peak value at the resonance frequency of the microphone 3, and decrease as the difference from the resonance frequency increases.

Such frequency characteristics of the transmission sound pressure and the reception sensitivity vary due to the individual differences of microphones 3. That is, with respect to the designed frequency characteristics indicated by the solid line, the characteristics may be shifted to the low frequency side as indicated by the broken line, or shifted to the high frequency side as indicated by the alternate long and short dash line.

Figure 3:
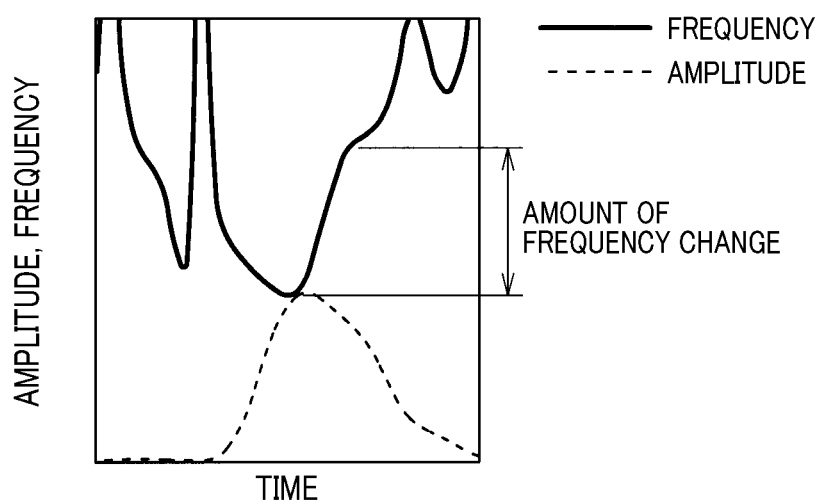
FIG. 3 is a graph of the amplitude and frequency of a received wave including an up-chirp signal.
Figure 4:
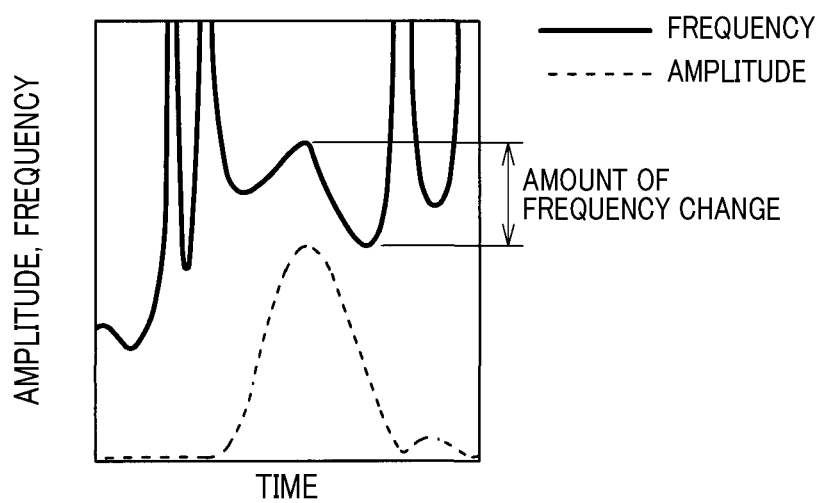
FIG. 4 is a graph of the amplitude and frequency of a received wave including a down-chirp signal.

For example, in the ultrasonic sensor 2 including the microphone 3 having the characteristics indicated by the alternate long and short dash line, a chirp signal is generated by sweeping the frequency of the pulse signal in a frequency band whose center is at the designed resonance frequency, the amplitude and frequency of the received wave would be as shown in FIGS. 3 and 4.

That is, regarding the up-chirp signal, since sweeping is started from a frequency that is far away from the resonance frequency, the transmission sound pressure is reduced. On the other hand, as for the down-chirp signal, since sweeping is started from a frequency that is close to the resonance frequency, the transmission sound pressure is increased.

In this embodiment, in order to reduce such variation in characteristics, the amplitude of the AC voltage output from the transmission circuit 4 is adjusted for each chirp signal so that the sound pressure of the ultrasonic wave transmitted from the microphone 3 is in a predetermined range.

Specifically, the parameter storage unit 11 stores a parameter for adjusting the sound pressure so that the sound pressure of the search wave is in a predetermined range, in the case the microphone 3 transmits the first search wave as the search wave. This predetermined range is referred to as a transmission target range. When the control unit 6 instructs transmission of the first search wave, the parameter selection unit 12 selects this parameter and transmits it to the transmission circuit 4. As a result, the amplitude of the AC voltage generated by the transmission circuit 4 is adjusted so that the amplitude of the first search wave transmitted by the microphone 3 is in the transmission target range.

The parameter storage unit 11 also stores a parameter for adjusting the sound pressure so that the sound pressure of the search wave is in the transmission target range, in the case the microphone 3 transmits the second search wave as the search wave. When the control unit 6 instructs transmission of the second search wave, the parameter selection unit 12 selects this parameter and transmits it to the transmission circuit 4. As a result, the amplitude of the AC voltage generated by the transmission circuit 4 is adjusted so that the amplitude of the second search wave transmitted by the microphone 3 is in the transmission target range.

Thus, the parameter selection unit 12 is configured to adjust the sound pressure of the first search wave and the sound pressure of the second search wave respectively so that they are in the transmission target range, and corresponds to a transmission sound pressure adjusting unit. The parameter storage unit 11 is configured to store a parameter for adjusting the sound pressure of the search wave, and corresponds to a transmission parameter storage unit.

In this embodiment, the value of the drive current of the transmission circuit 4 is used as the parameter for adjusting the sound pressure of the search wave, and the amplitude of the AC voltage generated by the transmission circuit 4 changes depending on the current value input from the parameter selection unit 12. However, it is also possible to use the value of the drive voltage of the transmission circuit 4 as the parameter for adjusting the sound pressure, and the amplitude of the AC voltage generated by the transmission circuit 4 may change depending on the voltage value input from the parameter selection unit 12.

The parameter storage unit 11 may be located outside the ultrasonic sensor 2, for example, in the ECU 1, or the parameter storage unit 11 may be located inside the ultrasonic sensor 2 to perform the parameter adjustment by software.

For example, the parameters for sound pressure adjustment of the first and second search waves are set before shipment of the ultrasonic sensor 2 and stored in the parameter storage unit 11. The method for setting the parameters for sound pressure adjustment will be described with reference to FIGS. 5 and 6.

Figure 5:
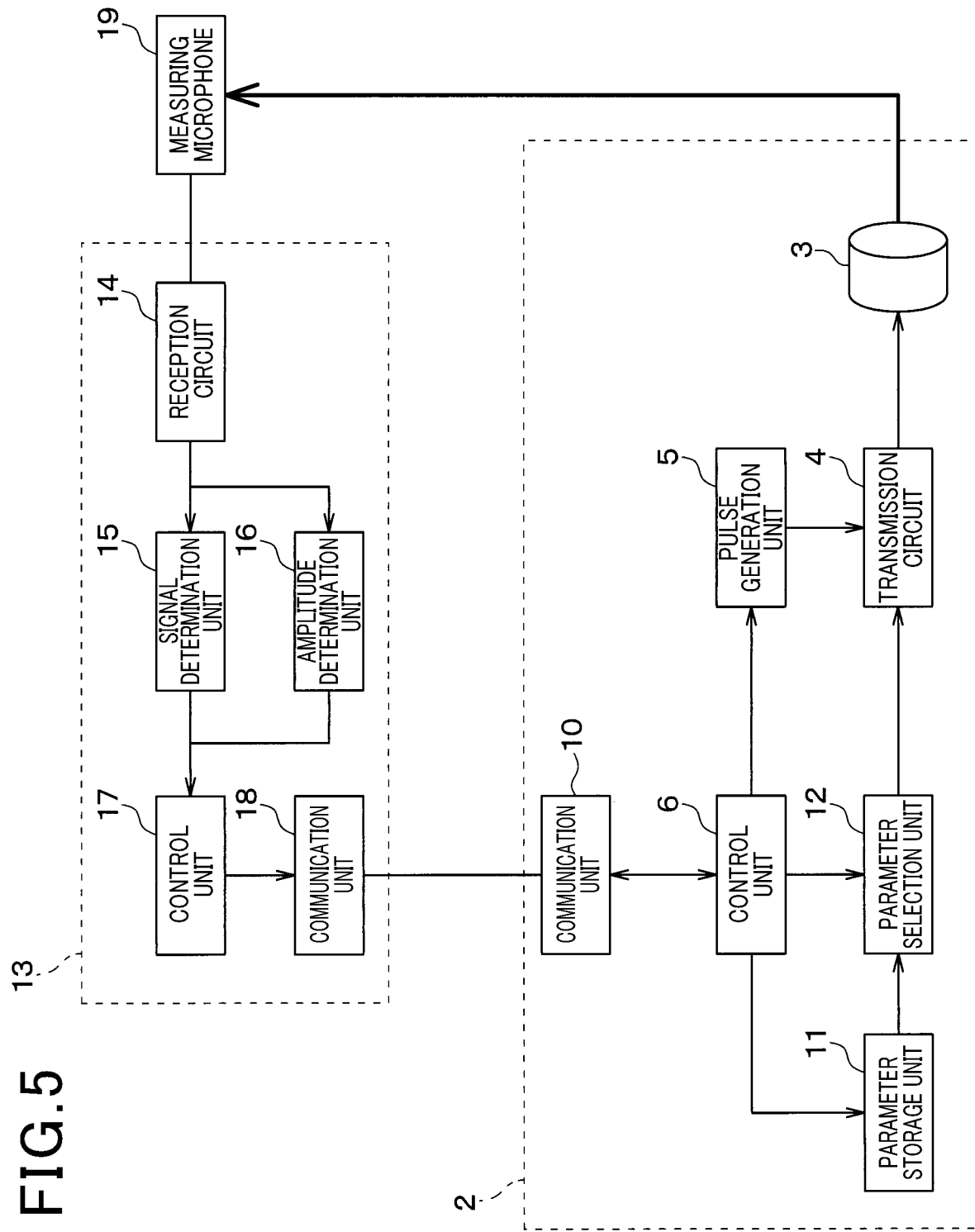
FIG. 5 is a configuration diagram showing a state in which an adjustment device is connected to a ultrasonic sensor.

As shown in FIG. 5, the parameters for sound pressure adjustment are set by connecting an adjustment device 13 to the ultrasonic sensor 2. In FIG. 5, the receiving circuit 7, the signal determination unit 8, and the distance determination unit 9 are not shown.

The adjustment device 13 includes a reception circuit 14, a signal determination unit 15, an amplitude determination unit 16, a control unit 17, and a communication unit 18. Further, a measuring microphone 19 having the same configuration as the microphone 3 is connected to the adjusting device 13. The measuring microphone 19 is placed so as to receive the ultrasonic wave transmitted by the microphone 3. When the measuring microphone 19 receives the ultrasonic wave, a voltage corresponding to the sound pressure of the received wave is input to the reception circuit 14 from the measuring microphone 19.

The reception circuit 14 has the same configuration as the reception circuit 7 of the ultrasonic sensor 2, and it detects the frequency and amplitude of the ultrasonic wave received by the measuring microphone 19. The signal determination unit 15 detects the change in the frequency of the received wave based on the frequency detected by the receiving circuit 14 to detect the chirp signal included in the received wave. The amplitude determination unit 16 determines whether the amplitude detected by the receiving circuit 14 is in a predetermined range.

The control unit 17 determines the correction value for the signal input to the transmission circuit 4 for each chirp signal based on the determination results of the signal determination unit 15 and the amplitude determination unit 16, and sends the result to the ultrasonic sensor 2 via the communication unit 18. The control unit 17 corrects the current value input to the transmission circuit 4 for each chirp signal in steps S11 to S17 shown in FIG. 6.

In step S11, the control unit 17 sends a wave transmission instruction to the control unit 6 of the ultrasonic sensor 2 via the communication unit 18 and the communication unit 10. Then, a wave transmission instruction is issued from the control unit 6 to the pulse generation unit 5, and the pulse generation unit 5 generates a pulse signal having a pattern designated by the control unit 6. Then, the first search wave or the second search wave is transmitted from the microphone 3, and the measuring microphone 19 receives the transmitted search wave.

The processing proceeds from step S11 to step S12, and the control unit 17 determines whether the difference between the measured value of the sound pressure of the received wave and the target value is 0 in step S12 and step S13. The target value is set according to the desired sound pressure of the ultrasonic wave transmitted from the microphone 3.

In step S12, the control unit 17 acquires information about the chirp signal and the sound pressure of the ultrasonic wave received by the measuring microphone 19. Specifically, when the measuring microphone 19 receives a search wave from the microphone 3, a voltage is input from the measuring microphone 19 to the reception circuit 14. The reception circuit 14 performs A/D conversion on the input voltage and then performs quadrature demodulation, and transmits the frequency information and amplitude information obtained thereby to the signal determination unit 15 and the amplitude determination unit 16, respectively. The signal determination unit 15 determines the chirp signal of the received wave based on the frequency information transmitted from the reception circuit 14, and transmits the determination result to the control unit 17. The amplitude determination unit 16 determines whether the measured value of the sound pressure of the received wave is equal to the target value, larger than the target value, or smaller than the target value based on the amplitude information transmitted from the receiving circuit 14, and transmits the determination result to the control unit 17.

In step S13, the control unit 17 determines whether or not the difference between the measured value of the sound pressure of the received wave and the target value is 0 based on the determination result transmitted from the amplitude determination unit 16.

Note that the target value is a range of values in this example. That is, in step S12, the amplitude determination unit 16 determines whether or not the measured value is in the transmission target range. If the measured value is in the transmission target range, it is determined that measured value−target value=0. Note that it is desired that the sound pressure of the search wave is within the range of ±2 dB from the desired sound pressure. That is, it is desirable that the transmission target range is a range whose center is the desired sound pressure and the transmission target range has a maximum value and a minimum value with a difference therebetween, the difference being set to be equal to or less than 4 dB. It is further desirable that the sound pressure of the search wave is in the range of ±0.5 dB from the desired sound pressure.

The measured value may be, for example, the peak value of the sound pressure amplitude. By comparing the peak value of the sound pressure amplitude with the target value and executing the processing of steps S16 and S17 according to the comparison result, the peak value of the sound pressure of the search wave would fall within the transmission target range. It is also possible to compare the magnitude of the sound pressure amplitude of the received wave at a predetermined frequency with the target value. In the case the magnitude of the sound pressure amplitude at a predetermined frequency is compared with the target value, for example, the sound pressure amplitude of the ultrasonic wave received by the measurement microphone 19 may be in the transmission target range at the frequencies from the start to the end of the sweeping of the pulse signal generated by the pulse generator 5.

According to the method of comparing the peak value with the target value, the adjustment device 13 can have a simple configuration. On the other hand, according to the method of comparing the magnitude of the sound pressure amplitude at a predetermined frequency with the target value, the sound pressure can be adjusted with high accuracy.

When it is determined in step S13 that measured value−target value=0, the processing proceeds to step S14, and the control unit 17 records the sound pressure adjustment parameter input from the parameter selection unit 12 to the transmission circuit 4 in step S11. Specifically, an instruction to record the value of the drive current of the transmission circuit 4 is issued from the control unit 17 to the control unit 6 via the communication unit 18 and the communication unit 10 so that the control unit 6 stores the drive current value of the transmission circuit 4 in the parameter storage unit 11.

When it is determined in step S13 that measured value−target value=0 is not satisfied, the processing proceeds to step S15, and the control unit 17 determines whether measured value−target value>0 is satisfied based on the determination result sent from the amplitude determination unit 16 in step S12.

When it is determined in step S15 that measured value−target value>0, the control unit 17 proceeds to step S16. In step S16, the control unit 17 sets a correction value so that the drive current value input to the transmission circuit 4 becomes smaller, and transmits the correction value to the ultrasonic sensor 2. On the other hand, when the measured value of the sound pressure is smaller than the target value and it is determined in step S15 that measured value−target value>0 is not satisfied, the processing proceeds to step S17, and the control unit 17 sets the correction value so that the drive current value input to the transmission circuit 4 becomes larger.

Note that, in step S16 and step S17, the control unit 17 selects one of the drive current values for the first search wave and the second search wave according to the determination result transmitted from the signal determination unit 15 in step S12, and sets the correction value.

The set correction value is sent to the control unit 6 via the communication unit 18 and the communication unit 10, and the control unit 6 corrects the drive current value according to the correction value. The control unit 17 proceeds from step S16 and step S17 to step S11. After the corrected drive current value is transmitted to the transmission circuit 4 by the parameter selection unit 12, an AC voltage having an amplitude corresponding to the corrected drive current value is generated, and an ultrasonic wave with a corrected sound pressure is transmitted from the microphone 3.

As the correction of the drive current value of the transmission circuit 4 is repeated in this way, measured value−target value approaches 0, and the sound pressure of the ultrasonic wave transmitted by the microphone 3 will become within the transmission target range. Then, the drive current value of the transmission circuit 4 at that time is stored in the parameter storage unit 11 in step S14.

Figure 6:
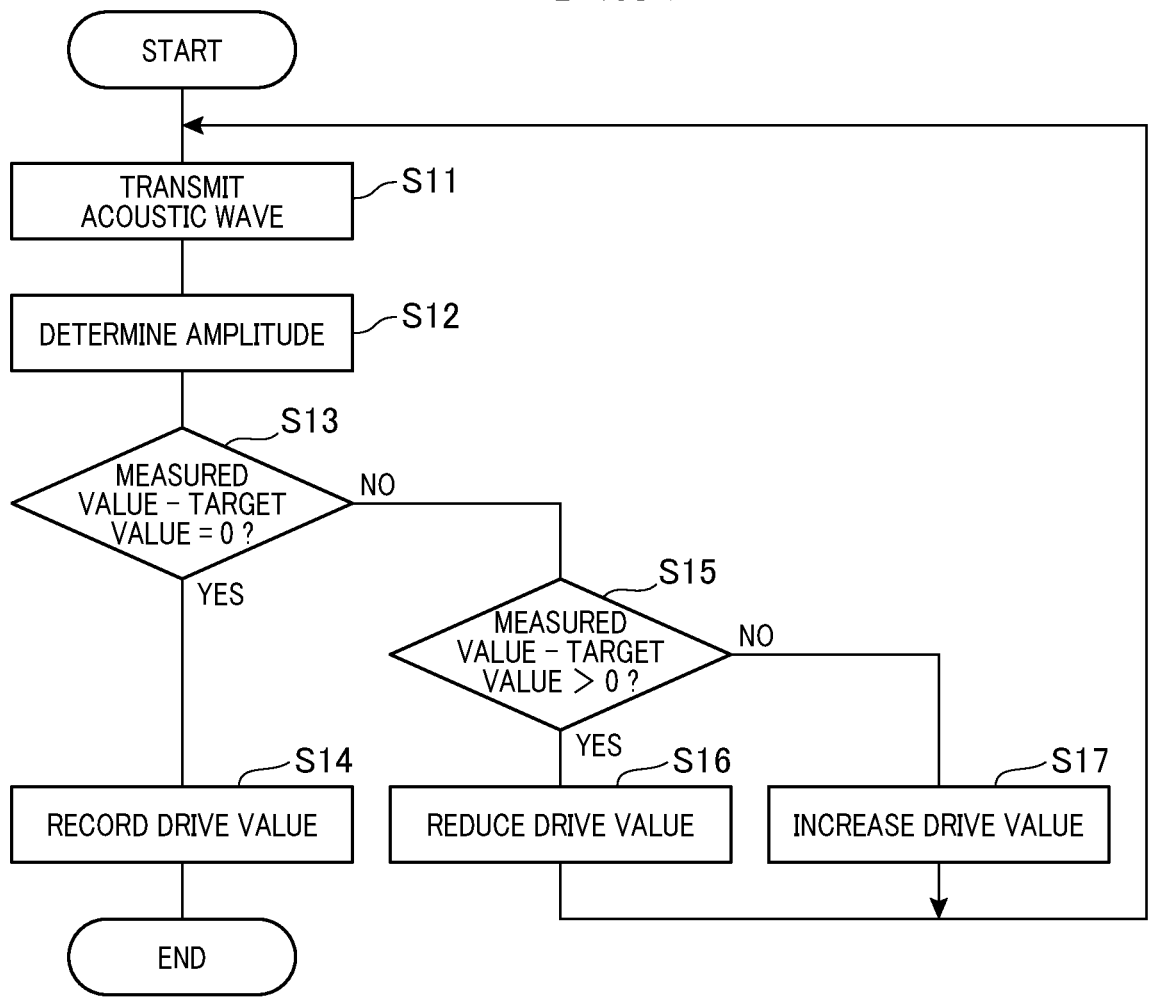
FIG. 6 is a flowchart of the process of determining a parameter for sound pressure adjustment.

The processing shown in FIG. 6 is performed for each of the first and second search waves, and the parameter storage unit 11 stores the sound pressure adjustment parameter for each of the first and second search waves. The parameter selection unit 12 selects the parameter according to the search wave from the parameters stored in the parameter storage unit 11, and sends the selected parameter to the transmission circuit 4 so that the sound pressure of each of the first and second search waves is within the transmission target range.

Thus, by adjusting the parameter for each of the first search wave and the second search wave so that the sound pressure is in the predetermined range, the difference between the detectable distances of the first search wave and the second search wave can be reduced. Therefore, the difference in detection performance between when the first search wave is transmitted and when the second search wave is transmitted can be reduced.

Second Embodiment

The second embodiment will be described. In the present embodiment, the parameter for adjusting the sound pressure is changed with respect to the first embodiment, and the other features are the same as those in the first embodiment. Thus, only the differences from the first embodiment will be described.

Figure 7:
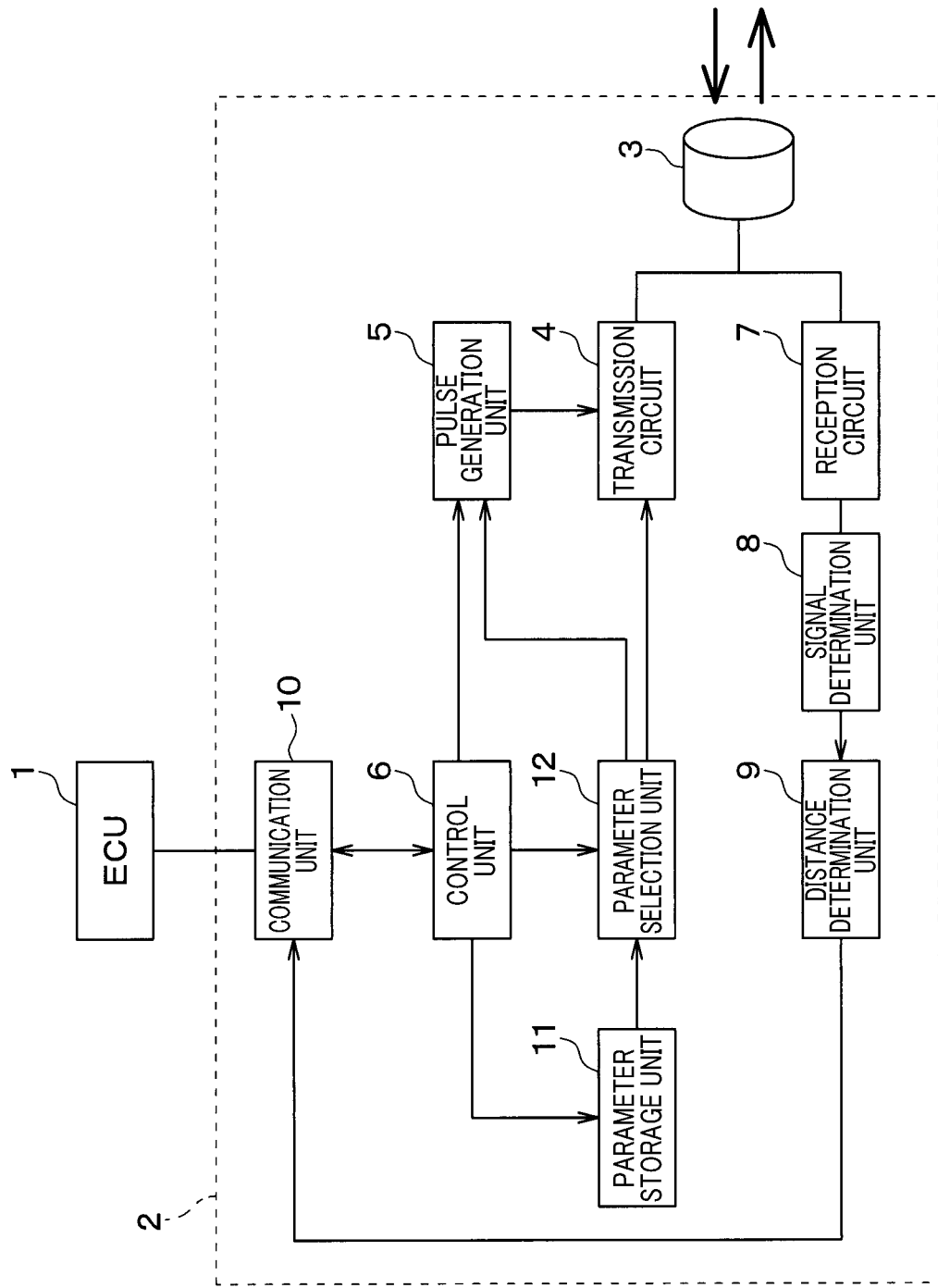
FIG. 7 is a configuration diagram of an object detection device according to the second embodiment.

As shown in FIG. 7, in this embodiment, the parameter selection unit 12 is connected to the pulse generation unit 5, and the frequency value is instructed to the pulse generation unit 5. The pulse generator 5 changes the frequency sweep range of the generated pulse signal according to the instructed frequency value.

The frequency value is corrected by the adjustment device 13 as in the first embodiment so as to have a value corresponding to the individual difference in the characteristics of the microphone 3.

For example, in the case of the ultrasonic sensor 2 comprising the microphone 3 having the characteristics indicated by the alternate long and short dash line in FIG. 2, if the frequency sweeping range of the chirp signal is set to a range corresponding to the microphone 3 having the characteristics indicated by the solid line, the sound pressure amplitude of the up-chirp signal becomes small. Then, when it is determined in step S15 that measured value−target value>0 is not satisfied, the frequency sweeping range is shifted to the high frequency side in step S17.

Further, for example, in the case of the ultrasonic sensor 2 comprising the microphone 3 having the characteristics indicated by the broken line in FIG. 2, if the frequency sweeping range of the chirp signal is set to a range corresponding to the microphone 3 having the characteristics indicated by the solid line, the sound pressure amplitude of the down-chirp signal becomes small. Then, when it is determined in step S15 that measured value−target value>0 is not satisfied, the frequency sweeping range is shifted to the low frequency side in step S17.

Thus, since the frequency sweeping range is changed using the frequency of the pulse signal as the parameter for adjusting the sound pressure of the search wave, the sound pressure amplitude of the transmission wave can be increased so that it is within the transmission target range.

Third Embodiment

The third embodiment will be described. In this embodiment, the operation of the pulse generating unit 5 and the parameter for sound pressure adjustment are changed with respect to the second embodiment, and the other features are the same as those in the second embodiment. Thus, only the differences from the second embodiment will be described.

Figure 8:
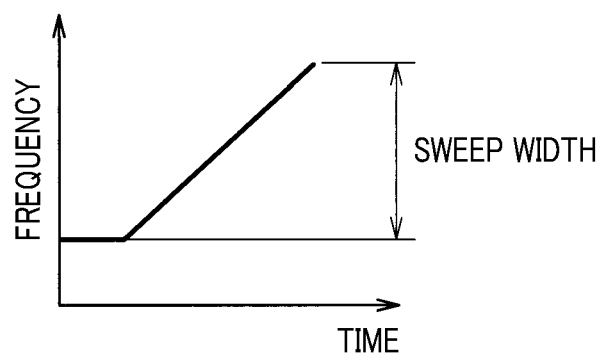
FIG. 8 is a graph of the frequency of a pulse signal in the third embodiment.

As shown in FIG. 8, in the present embodiment, a pulse signal is generated at a constant frequency, and after an ultrasonic wave having a constant frequency is transmitted, frequency sweeping of the pulse signal is started. Note that, although FIG. 8 illustrates the case where the first search wave is transmitted after the search wave having a constant frequency, also in the case where the second search wave is transmitted, the search wave having a constant frequency is transmitted before the second search wave. The parameter selection unit 12 instructs the pulse generation unit 5 on the number of pulse signals having a constant frequency.

By starting the frequency sweeping of the pulse signal after generating a pulse signal having a constant frequency, the sound pressure of the search wave at the start of sweeping increases, and the frequency change of the received wave can be captured easily. In the present embodiment, it is possible to make the sound pressure of the transmission wave be within the transmission target range by reducing the number of pulse signals having a constant frequency in step S16 and increasing the number of pulse signals having a constant frequency in step S17.

Thus, the parameter for adjusting the sound pressure of the search wave may be the number of pulse signals input to the transmission circuit 4 to transmit the search wave having a constant frequency.

Fourth Embodiment

The fourth embodiment will be described. This embodiment is different from the first embodiment in that a configuration for correcting the output signal of the receiving circuit 7 is added, and the rest is the same as the first embodiment. Thus, only the differences from the first embodiment will be described.

In the first embodiment, the sound pressures of the first and second search waves are corrected respectively, but in the present embodiment, further, the ultrasonic reception sensitivity is corrected for each chirp signal included in the received wave.

Figure 9:
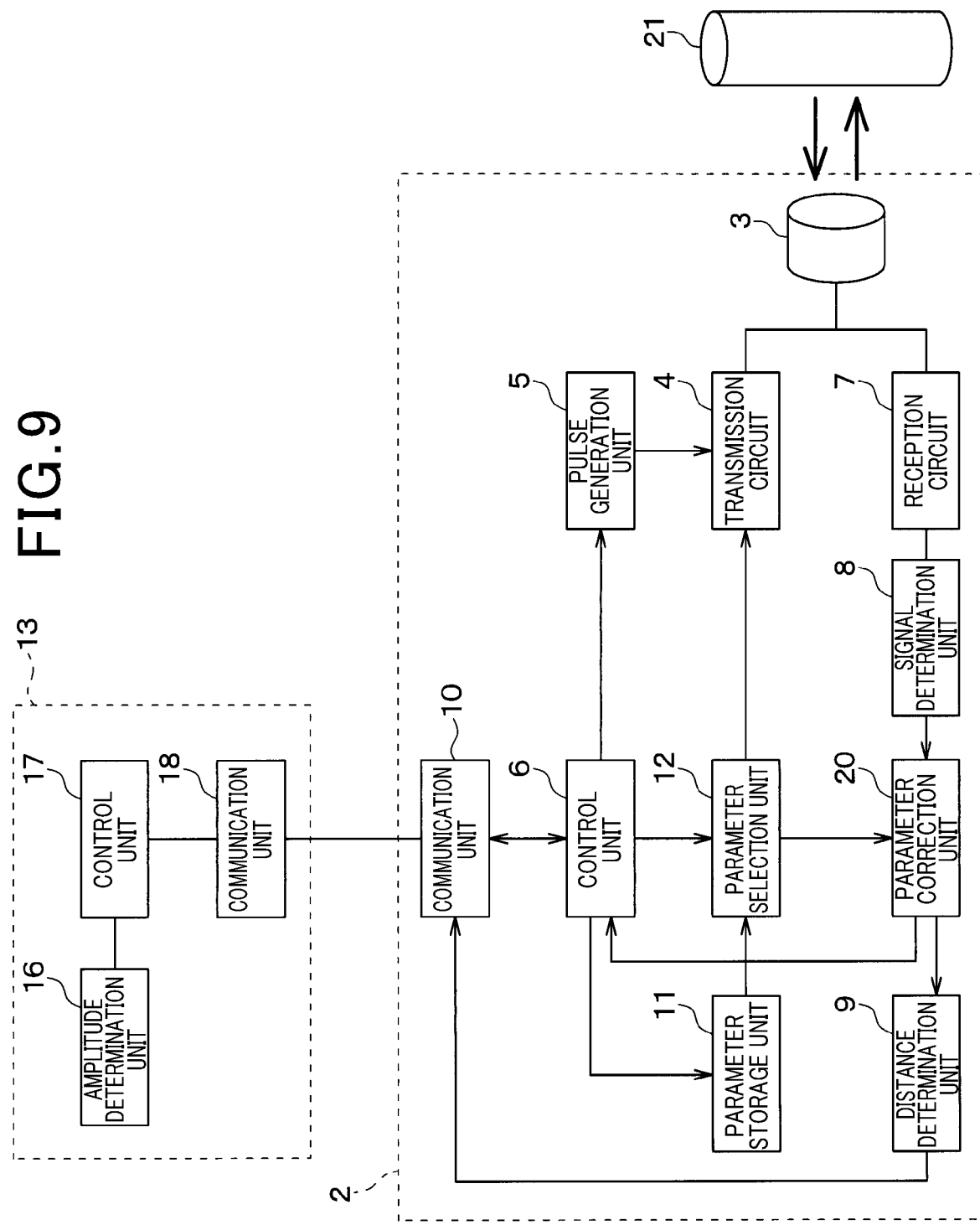
FIG. 9 is a configuration diagram of an object detection device and an adjustment device according to the fourth embodiment.

As shown in FIG. 9, the ultrasonic sensor 2 of this embodiment comprises a parameter correction unit 20, and the output signal from the signal determination unit 8 is input to the distance determination unit 9 via the parameter correction unit 20.

The parameter correction unit 20 is configured to correct the output signal of the reception circuit 7 input via the signal determination unit 8 so that it is within a predetermined range, and the parameter correction unit corresponds to a reception sensitivity adjustment unit. This predetermined range is referred to as a reception target range.

The receiving circuit 7 output, as the output signal, a first output signal in response to the microphone 3 receiving the reflected wave of the first search wave; and output, as the output signal, a second output signal in response to the microphone 3 receiving the reflected wave of the second search wave. The parameter correction unit 20 corrects a value of each of the first and second output signals so that the value of the corresponding one of the first and second output signals is within the reception target range.

Specifically, for each of the first and second search waves, a sensitivity coefficient is stored in the parameter storage unit 11 as a parameter for correcting the output signal of the receiving circuit 7. The parameter selection unit 12 selects a sensitivity coefficient according to the search wave and sends it to the parameter correction unit 20. The parameter storage unit 11 corresponds to a reception parameter storage unit.

When the microphone 3 transmits the first search wave and the signal determination unit 8 determines that the received wave is a reflected wave of the search wave transmitted from the microphone 3, the parameter correction unit 20 outputs the product of the amplitude detected by the reception circuit 7 multiplied by the sensitivity coefficient for first search wave. Similarly, when the microphone 3 transmits the second search wave and the signal determination unit 8 determines that the received wave is a reflected wave of the search wave transmitted from the microphone 3, the parameter correction unit 20 outputs the product of the amplitude detected by the reception circuit 7 multiplied by the sensitivity coefficient for second search wave.

The receiving circuit 7 output, as the output signal, a first output signal in response to the microphone 3 receiving the reflected wave of the first search wave; and output, as the output signal, a second output signal in response to the microphone 3 receiving the reflected wave of the second search wave. The parameter correction unit 20 corrects a value of each of the first and second output signals so that the value of the corresponding one of the first and second output signals is within the reception target range in such a manner. The distance determination unit 9 detects the distance to the object based on the output signal of the parameter correction unit 20.

The method of setting the sensitivity coefficients will be described with reference to FIGS. 9 and 10. As shown in FIG. 9, the setting of sensitivity coefficients is performed by connecting the adjustment device 13 to the ultrasonic sensor 2 and placing an object for adjustment 21 at a position where it would reflect the search wave transmitted from the microphone 3. The adjustment device 13 includes the amplitude determination unit 16, the control unit 17, and the communication unit 18. In the present embodiment, the amplitude determination unit 16 determines whether or not the amplitude of the received wave is in a predetermined range based on a signal from the control unit 17.

The control unit 17 determines the correction value for the sensitivity coefficient for each chirp signal based on the determination result of the amplitude determination unit 16, and sends the result to the ultrasonic sensor 2 via the communication unit 18. Specifically, the control unit 17 corrects the sensitivity coefficient used by the parameter correction unit 20 for each chirp signal in steps S21 to S27 shown in FIG. 10.

In step S21, the control unit 17 sends a wave transmission instruction to the control unit 6 of the ultrasonic sensor 2 via the communication unit 18 and the communication unit 10. Next, a wave transmission instruction is issued from the control unit 6 to the pulse generation unit 5, and the pulse generation unit 5 generates a pulse signal having a pattern designated by the control unit 6. Then, the first search wave or the second search wave is transmitted from the microphone 3, and the microphone 3 receives a reflected wave of the search wave reflected by the object for adjustment 21.

The processing proceeds from step S21 to step S22, and the control unit 17 determines whether or not the difference between the measured value of the sound pressure of the received wave and the target value is 0 in step S22 and step S23. The target value is set according to the desired sound pressure of the ultrasonic wave received by the microphone 3. In addition, as with the first embodiment, the target value is a range of values in this embodiment.

In step S22, the control unit 17 measures the amplitude of the received wave detected by the parameter correction unit 20. Specifically, when the microphone 3 receives the reflected wave, a voltage is input from the microphone 3 to the receiving circuit 7, and the receiving circuit 7 performs A/D conversion on the input voltage, and performs quadrature demodulation to detect the frequency and amplitude of the received wave. The parameter correction unit 20 outputs the result of the amplitude detected by the receiving circuit 7 multiplied by the sensitivity coefficient, and the output signal of the parameter correction unit 20 is sent to the control unit 17 via the control unit 6, the communication unit 10, and the communication unit 18. Then, the control unit 17 calculates the sound pressure of the ultrasonic wave received by the microphone 3 based on the amplitude information sent from the parameter correction unit 20, and transmits the calculated sound pressure to the amplitude determination unit 16.

The control unit 17 acquires information about the chirp signal of the received wave. Specifically, the reception circuit 7 sends the frequency information detected by the quadrature demodulation to the signal determination unit 8, and the signal determination unit 8 determines the chirp signal of the reception wave based on the frequency information sent from the reception circuit 7. The determination result of the signal determination unit 8 is sent to the control unit 17 via the parameter correction unit 20, the control unit 6, the communication unit 10, and the communication unit 18.

The amplitude determination unit 16 determines whether the measured value of the sound pressure of the received wave is equal to the target value, larger than the target value, or smaller than the target value, and transmits the determination result to the control unit 17.

In step S23, the control unit 17 determines whether the difference between the measured value of the sound pressure of the received wave and the target value is 0 based on the determination result transmitted from the amplitude determination unit 16.

As described above, the target value is a range of values. That is, in step S22, the amplitude determination unit 16 determines whether the measured value is in the reception target range. If the measured value is in the reception target range, it is determined that measured value−target value=0.

When it is determined in step S23 that measured value−target value=0, the processing proceeds to step S24, and the control unit 17 records the sensitivity coefficient used by the parameter correction unit 20 in step S21. Specifically, an instruction to record the sensitivity coefficient is issued from the control unit 17 to the control unit 6 via the communication unit 18 and the communication unit 10, so that the control unit 6 causes the parameter storage unit 11 to store the sensitivity coefficient.

When it is determined in step S23 that measured value−target value=0 is not satisfied, the processing proceeds to step S25, and the control unit 17 determines whether measured value−target value>0 is satisfied based on the determination result sent from the amplitude determination unit 16 in step S22.

When it is determined in step S25 that measured value−target value>0, the control unit 17 proceeds to step S26. In step S26, the control unit 17 sets a correction value so that the sensitivity coefficient input to the parameter correction unit 20 becomes smaller, and transmits the correction value to the ultrasonic sensor 2. On the other hand, when the measured value is smaller than the target value and it is determined in step S25 that measured value−target value>0 is not satisfied, the control unit 17 proceeds to step S27, and sets the correction value so that the sensitivity coefficient input to the parameter correction unit 20 becomes larger.

Note that, in step S26 and step S27, the control unit 17 selects one of the sensitivity coefficients for the first search wave and the second search wave according to the determination result obtained from the signal determination unit 8 in step S22, and sets the correction value.

The set correction value is sent to the control unit 6 via the communication unit 18 and the communication unit 10, and the control unit 6 corrects the sensitivity coefficient according to the correction value. The control unit 17 proceeds from step S26 and step S27 to step S21. Then, the corrected sensitivity coefficient is sent to the parameter correction unit 20 via the parameter selection unit 12, and after multiplying the amplitude of the received wave detected by the reception circuit 7 by the corrected sensitivity coefficient, the result is sent to the control unit 17.

As the correction of the sensitivity coefficient is repeated in this way, measured value−target value approaches 0, and the magnitude of the signal transmitted from the receiving circuit 7 to the distance determination unit 9 via the signal determination unit 8 and the parameter correction unit 20 will become within the reception target range. Then, the sensitivity coefficient at that time is stored in the parameter storage unit 11 in step S24.

Figure 10:
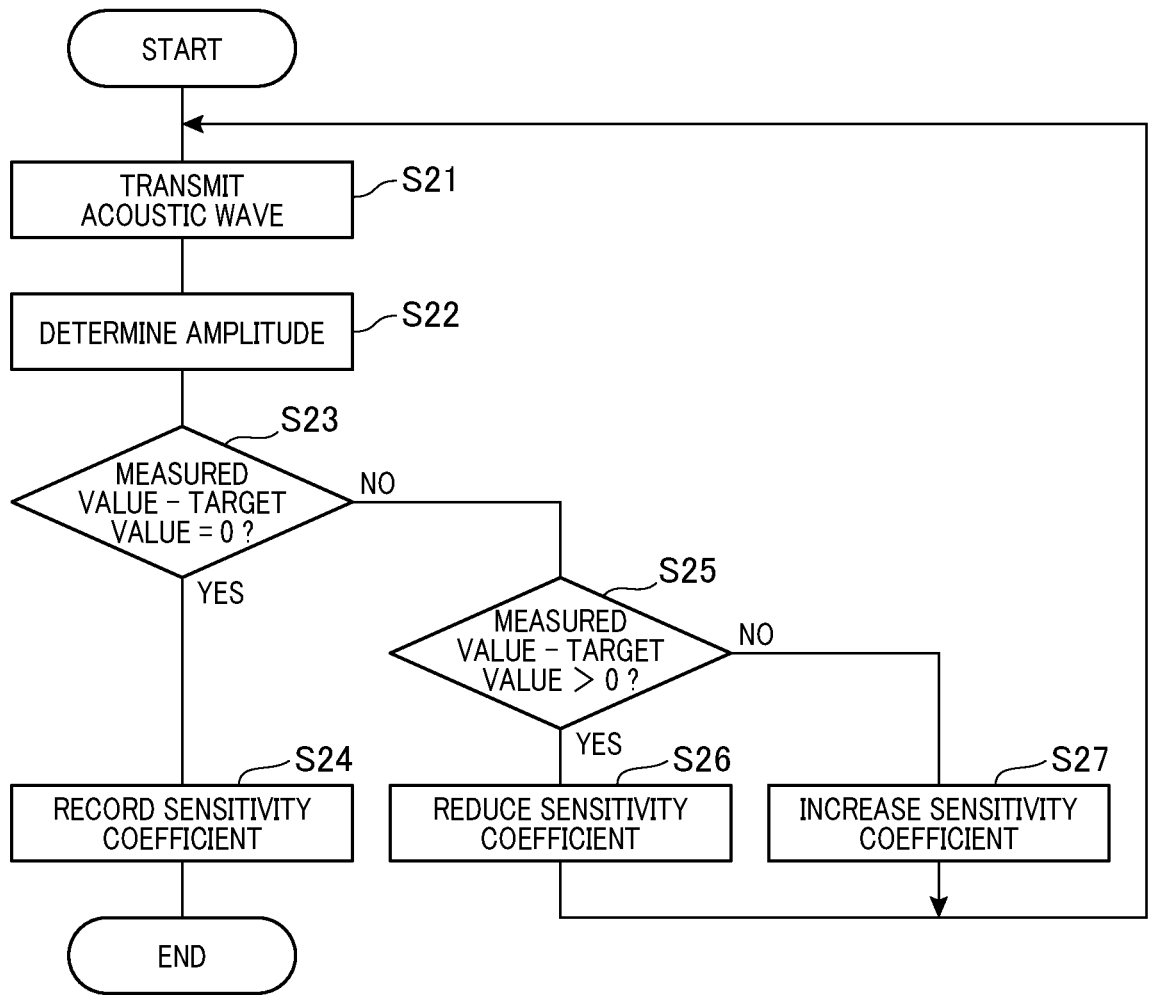
FIG. 10 is a flowchart of the process of determining the sensitivity coefficient.

The processing shown in FIG. 10 is performed for each of the first and second search waves, and the parameter storage unit 11 stores the sensitivity coefficient for each of the first and second search waves. To detect an object, the parameter selection unit 12 selects a sensitivity coefficient corresponding to the search wave from the sensitivity coefficients stored in the parameter storage unit 11 and transmits the selected sensitivity coefficient to the parameter correction unit 20. As a result, the amplitude used in the determination by the distance determination unit 9 is within the reception target range for each of the first and second search waves.

Thus, by adjusting the sensitivity coefficient for each of the first search wave and the second search wave so that the amplitude of the received wave used in the determination by the distance determination unit 9 is in the predetermined range, the difference between the detectable distances of the first search wave and the second search wave can be reduced. This further reduces the difference in detection performance.

In addition, in a case where the object detection device comprises a plurality of ultrasonic sensors 2 and the reflected waves of a search wave transmitted from one ultrasonic sensor 2 are received by other ultrasonic sensors 2, the detection performance of the ultrasonic sensors 2 can be equalized with each other.

When the time for the microphone 3 detecting the received wave is short and the number of samples of the signal used by the receiving circuit 7 detecting the frequency and amplitude is small, the amplitude of the received wave detected by the receiving circuit 7 may be smaller than the actual amplitude. In view of this, the length of the time may be used as the correction parameter. That is, the parameter correction unit 20 is configured to instruct the reception circuit 7 of the length of time for detecting the received wave, and when the detected amplitude is small, in step S27, the length of time is increased so that the number of samples of the signal used by the reception circuit 7 detecting frequency and amplitude can be increased. When the detected amplitude is large, this time may be shortened.

Figure 11:
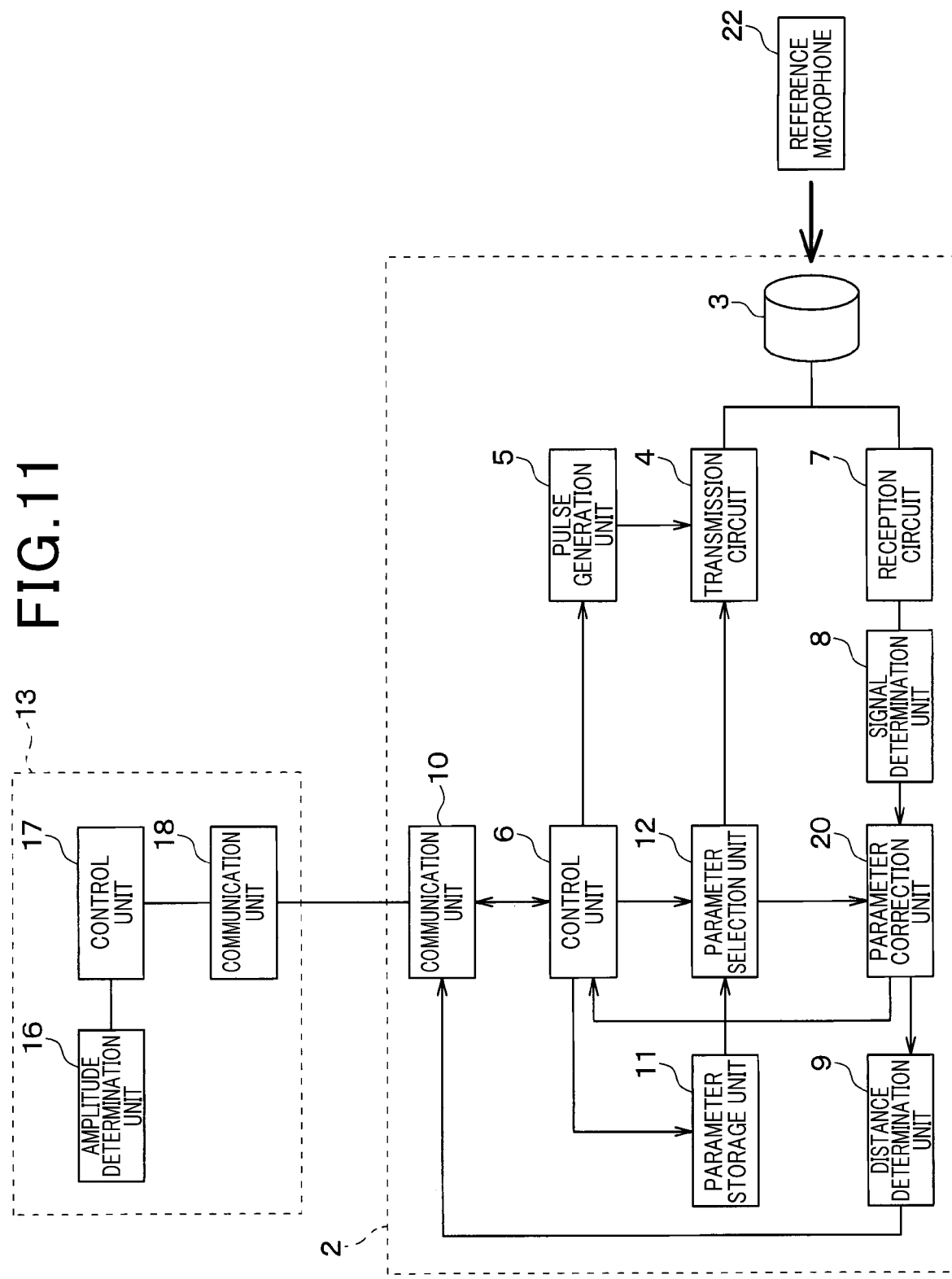
FIG. 11 is a configuration diagram of a modified example of the fourth embodiment.

In addition, as shown in FIG. 11, the sensitivity coefficient may be adjusted by providing a reference microphone 22 as an adjustment transmission unit. That is, an ultrasonic wave including a chirp signal is transmitted from the reference microphone 22 towards the microphone 3, and the ultrasonic wave is received by the microphone 3. The sensitivity coefficient may be corrected such that the output signal of the parameter correction unit 20 output when the microphone 3 receives the ultrasonic wave is within the reception target range. In this case, the reference microphone 22 transmits an ultrasonic wave whose frequency changes in the same manner as the first search wave towards the microphone 3, and the microphone 3 receives the ultrasonic wave. The sensitivity coefficient is changed such that the output signal of the parameter correction unit 20 output when the microphone 3 receives the ultrasonic wave is within the reception target range. Further, the reference microphone 22 transmits an ultrasonic wave whose frequency changes in the same manner as the second search wave towards the microphone 3, and the microphone 3 receives the ultrasonic wave. The sensitivity coefficient is changed such that the output signal of the parameter correction unit 20 output when the microphone 3 receives the ultrasonic wave is within the reception target range.

Fifth Embodiment

The fifth embodiment will be described. This embodiment is different from the fourth embodiment in that a configuration for detecting temperature is added, and the other parts are similar to those of the fourth embodiment. Therefore, only the differences from the fourth embodiment will be described.

Figure 12:
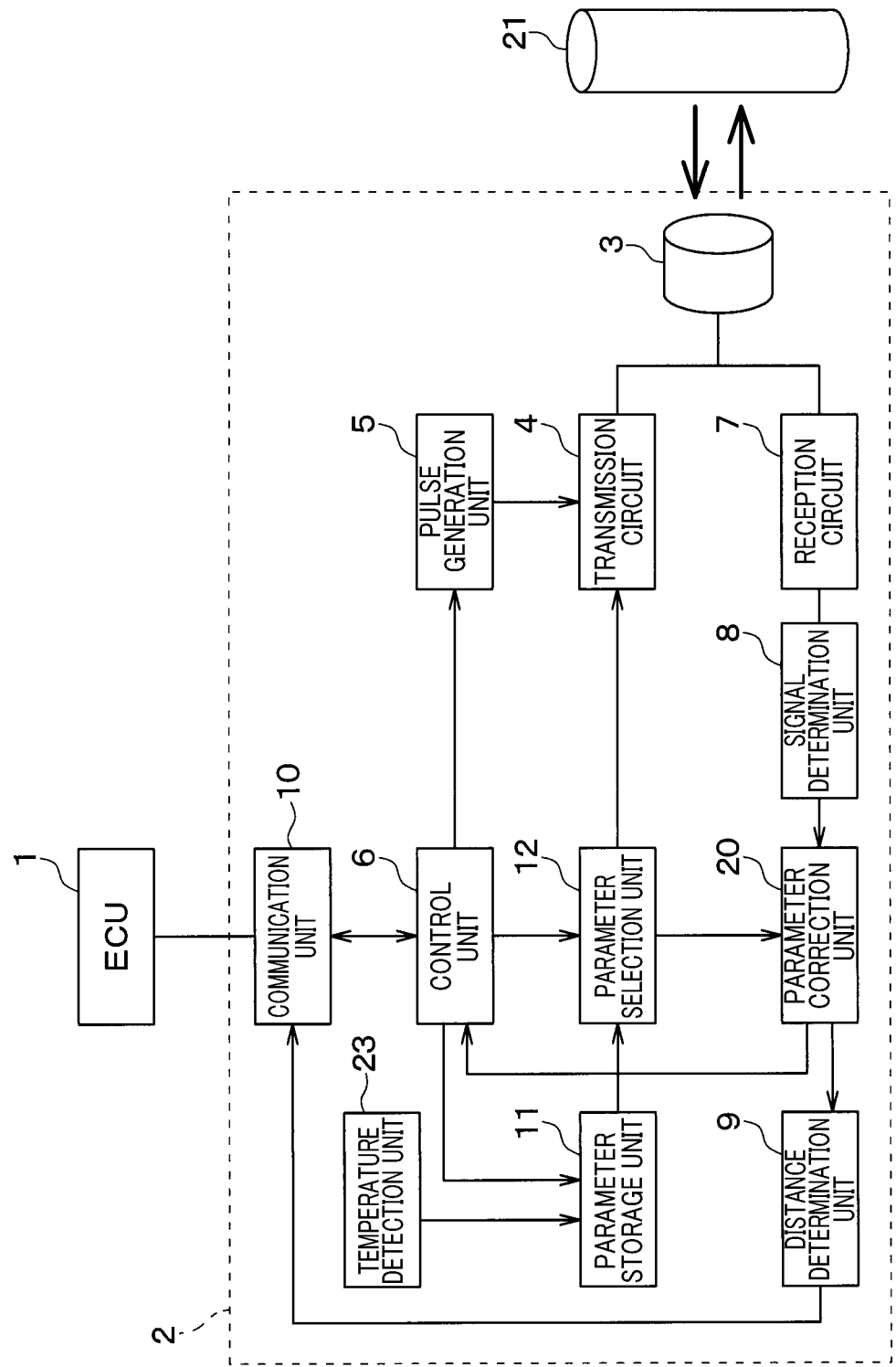
FIG. 12 is a configuration diagram of an object detection device according to the fifth embodiment.

As shown in FIG. 12, the ultrasonic sensor 2 of this embodiment comprises a temperature detection unit 23 configured to detect an ambient temperature. The parameter storage unit 11 corrects a stored parameter according to the temperature detected by the temperature detection unit 23 and sends the corrected parameter to the parameter selection unit 12.

For example, when the microphone 3 has such a characteristic that its sensitivity decreases as the temperature increases and its sensitivity increases as the temperature decreases, the parameter storage unit 11 increases the sensitivity coefficient as the temperature increases, and reduces the sensitivity coefficient as the temperature decreases.

The difference in detection performance can be further reduced by changing the sensitivity coefficient stored in the parameter storage unit 11 according to the temperature in such manner.

Other Embodiments

Note that the present disclosure is not limited to the above-described embodiments, and it can be modified as appropriate. In addition, the above embodiments are not irrelevant to each other, and they can be appropriately combined unless the combination is clearly impossible. It is needless to say that the elements constituting the embodiments are not necessarily essential unless explicitly stated as essential or obviously considered essential in principle.

For example, in the first embodiment, it is possible that the object detection device comprises a plurality of ultrasonic sensors 2, and the parameter selection unit 12 of each ultrasonic sensor 2 adjusts the sound pressure of each of the first and second search waves so that the sound pressure of each search wave or the sound pressure of the reflected wave is within the transmission target range.

As another example, in the first embodiment, in order to adjust the sound pressure of the search wave, the adjustment device 13 of the fourth embodiment may be connected to the ultrasonic sensor 2 and the object for adjustment 21 may be provided. That is, a search wave from the microphone 3 may be reflected by the object for adjustment 21, and the sound pressure amplitude of the reflected wave may be detected. The parameters stored in the parameter storage unit 11 may be adjusted so that the amplitude determination unit 16 determines that the peak value of the detected sound pressure amplitude is within the transmission target range. In this case, the parameters are adjusted so that both the sound pressure of the reflected wave of the first search wave and the sound pressure of the reflected wave of the second search wave are within the transmission target range.

What is claimed is:
1. An object detection device comprising:
a transmission unit that transmits an ultrasonic wave as a search wave;
a reception unit that receives an ultrasonic wave and outputs a signal as an output signal; and
a distance detection unit that detects a distance to an object based on the output signal of the reception unit, when a frequency of the ultrasonic wave received by the reception unit changes in the same manner as a frequency of the search wave, wherein
the object detection device further comprises a transmission sound pressure adjustment unit that adjusts a sound pressure of the search wave so that the sound pressure of the search wave or a sound pressure of a reflected wave based on the search wave is within a predetermined transmission target range,
the transmission unit transmits, as the search wave, a first search wave with a first frequency that changes with time at a first rate and a second search wave with a second frequency that changes with time at a second rate that is different from the first rate of the first search wave, and the transmission sound pressure adjustment unit is configured to adjust the sound pressure of each of the first and second search waves so that the sound pressure of the corresponding one of the first and second search waves or the sound pressure of the reflected wave based on the corresponding one of the first and second search waves is within the transmission target range, which reduces a difference in detection performance between the first search wave and the second search wave, the difference in detection performance between the first search wave and the second search wave resulting from a frequency characteristic of the transmission unit.

2. The object detection device according to claim 1, further comprising:
a plurality of ultrasonic sensors each including the transmission unit, the reception unit, and the transmission sound pressure adjustment unit,
the transmission sound pressure adjustment unit of each of the plurality of ultrasonic sensors adjusts the sound pressure of the first search wave and the sound pressure of the second search wave.

3. The object detection device according to claim 1, wherein the transmission sound pressure adjustment unit adjusts the sound pressure of each of the first and second search waves so that a peak value of the sound pressure of the corresponding one of the first and second search waves is within the transmission target range.

4. The object detection device according to claim 1, wherein the transmission sound pressure adjustment unit adjusts the sound pressure of each of the first and second search waves so that a value of the sound pressure of a part of the corresponding one of the first and second search waves is within the transmission target range, a frequency of the part of each of the first and second search waves being in a predetermined frequency band.

5. The object detection device according to claim 1, wherein the transmission sound pressure adjustment unit adjusts the sound pressure of each of the first and second search waves so that a peak value of the sound pressure of the reflected wave of the corresponding one of the first and second search waves is within the transmission target range.

6. The object detection device according to claim 1, wherein the transmission sound pressure adjustment unit uses an electric current value input to the transmission unit as a parameter for adjusting the sound pressure of each of the first and second search waves.

7. The object detection device according to claim 1, wherein the transmission sound pressure adjustment unit uses a voltage value input to the transmission unit as a parameter for adjusting the sound pressure of each of the first and second search waves.

8. The object detection device according to claim 1, wherein the transmission unit is configured to transmit the ultrasonic wave as each of the first and second search waves in response to receiving a pulse signal, and
the transmission sound pressure adjustment unit uses a frequency of the pulse signal input to the transmission unit as a parameter for adjusting the sound pressure of each of the first and second search waves.

9. The object detection device according to claim 1, wherein the transmission unit transmits a preliminary ultrasonic wave having a constant frequency before transmitting the first search wave or the second search wave, and
the transmission sound pressure adjustment unit uses, as a parameter for adjusting the sound pressure of each of the first and second search waves, the number of pulse signals input to the transmission unit to transmit the ultrasonic wave.

10. The object detection device according to claim 1, further comprising a transmission parameter storage unit that stores a parameter for adjusting the sound pressure of each of the first and second search waves.

11. The object detection device according to claim 1, wherein
the transmission target range has a maximum value and a minimum value with a difference therebetween, and the difference is set to be equal to or less than 4 dB.

12. The object detection device according to claim 1, further comprising a reception sensitivity adjustment unit that corrects the output signal of the reception unit so that a value of the output signal is within a predetermined reception target range, wherein
the reception unit is configured to:
output, as the output signal, a first output signal in response to the reception unit receiving the reflected wave of the first search wave; and
output, as the output signal, a second output signal in response to the reception unit receiving the reflected wave of the second search wave; and
the reception sensitivity adjustment unit corrects a value of each of the first and second output signals so that the value of the corresponding one of the first and second output signals is within the reception target range to thereby reduce the difference in detection performance between the first search wave and the second search wave, the difference in detection performance between the first search wave and the second search wave resulting from a frequency characteristic of the reception unit.

13. The object detection device according to claim 12, wherein the reception sensitivity adjustment unit uses a sensitivity coefficient to be multiplied by a value of the output signal of the reception unit as a parameter for correcting the output signal of the reception unit.

14. The object detection device according to claim 12, wherein
the reception sensitivity adjustment unit uses, as a parameter for correcting the output signal of the reception unit, a length of time for which the reception unit detects a received wave.

15. The object detection device according to claim 12, further comprising a reception parameter storage unit that stores a parameter for correcting the output signal of the reception unit.

16. The object detection device according to claim 15, further comprising a temperature detection unit that detects an ambient temperature, wherein
a parameter stored in the reception parameter storage unit is corrected according to the ambient temperature detected by the temperature detection unit.

* * * * *